United States Patent
Jawahar

(10) Patent No.: US 10,992,473 B2
(45) Date of Patent: *Apr. 27, 2021

(54) SECURE SINGLE SIGN ON AND CONDITIONAL ACCESS FOR CLIENT APPLICATIONS

(71) Applicant: Citrix Systems, Inc., Fort Lauderdale, FL (US)

(72) Inventor: Janardhanan Jawahar, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,598

(22) Filed: Jan. 10, 2019

(65) Prior Publication Data
US 2019/0149514 A1 May 16, 2019

Related U.S. Application Data

(63) Continuation of application No. 15/919,935, filed on Mar. 13, 2018, now Pat. No. 10,218,679, which is a
(Continued)

(51) Int. Cl.
*H04L 9/00* (2006.01)
*H04L 9/32* (2006.01)
(Continued)

(52) U.S. Cl.
CPC .......... *H04L 9/3213* (2013.01); *H04L 9/3268* (2013.01); *H04L 63/029* (2013.01); *H04L 63/0263* (2013.01); *H04L 63/0272* (2013.01);
*H04L 63/083* (2013.01); *H04L 63/0815* (2013.01); *H04L 63/0823* (2013.01); *H04L 63/10* (2013.01); *H04L 63/20* (2013.01);
(Continued)

(58) Field of Classification Search
CPC ....... H04L 63/10; H04L 63/029; H04L 63/20; H04L 63/0815; H04L 9/3268; H04L 9/3213
See application file for complete search history.

(56) References Cited

U.S. PATENT DOCUMENTS 8,549,300 B1 10/2013 Kumar et al.
9,363,251 B2 * 6/2016 Morikuni .......... H04W 12/0608
(Continued)

OTHER PUBLICATIONS

Feb. 18, 2019 (EP) Search Report—App 18196098.0.
(Continued)

*Primary Examiner* — Beemnet W Dada
(74) *Attorney, Agent, or Firm* — Banner & Witcoff, Ltd.

(57) ABSTRACT

Methods and systems for implementing single sign on (SSO) and/or conditional access for client applications are described herein. The system may comprise an identity provider gateway, and the system may authenticate a user of the client application using the identity provider gateway. In some aspects, a secure communication tunnel may be established between the client application and the identity provider gateway, and the secure communication tunnel may use, for example, a client certificate. The identity provider gateway may grant or deny the client application access to one or more resources based on information associated with the client certificate.

20 Claims, 11 Drawing Sheets

Related U.S. Application Data continuation of application No. 15/716,871, filed on Sep. 27, 2017, now Pat. No. 9,948,612.

(51) Int. Cl.
  *H04L 29/06* (2006.01)
  *H04W 12/08* (2021.01)
  *H04W 12/06* (2021.01)
  *H04W 12/069* (2021.01)
  *H04W 12/37* (2021.01)
  *H04W 12/71* (2021.01)
  *H04W 12/72* (2021.01)

(52) U.S. Cl.
  CPC ....... *H04W 12/068* (2021.01); *H04W 12/069* (2021.01); *H04W 12/08* (2013.01); *H04L 63/108* (2013.01); *H04W 12/37* (2021.01); *H04W 12/71* (2021.01); *H04W 12/72* (2021.01)

(56) References Cited

U.S. PATENT DOCUMENTS

| | | | | |
|---|---|---|---|---|
| 9,948,612 | B1* | 4/2018 | Jawahar | H04L 9/3213 |
| 10,218,679 | B1* | 2/2019 | Jawahar | H04L 9/3213 |
| 2006/0105741 | A1 | 5/2006 | Suh et al. | |
| 2009/0133110 | A1 | 5/2009 | Kumar et al. | |
| 2011/0179473 | A1* | 7/2011 | Lee | H04L 63/1466 |
| | | | | 726/6 |
| 2011/0238996 | A1 | 9/2011 | Xiao et al. | |
| 2014/0233545 | A1 | 8/2014 | Ferguson-James et al. | |
| 2015/0199500 | A1* | 7/2015 | Jagtap | G06F 21/45 |
| | | | | 726/1 |
| 2016/0219060 | A1* | 7/2016 | Karunakaran | G06F 21/33 |
| 2017/0063839 | A1 | 3/2017 | Barton et al. | |

OTHER PUBLICATIONS

"Citrix Secure Hub" Citrix Product Documentation, Citrix Systems, Inc. Jul. 5, 2017, pp. 1-17.
"How SAML Authentication Works" https://auth0.com/blog/how-saml-authentication-works/ website visited Aug. 4, 2017, pp. 1-39.
"How to Configure and Troubleshoot Full VPN Setup on a NetScaler Gateway Appliance" https://support.citrix.com/article/CTX224709 website visited Aug. 4, 2017, pp. 1-16.
Jeff Tyson et al. "How VPNs Work" http://computer.howstuffworks.com/vpn.htm websited visited Aug. 4, 2017, pp. 1-6.
Ian Paul "How—and why—you should use a VPN any time you hop on the internet" https://plus.google.com/+TechHiveUS/posts Jul. 6, 2017, pp. 1-8.
"Identity Providers and Service Providers" https://help.salesforce.com/articleView?id=identity_provider_about.htm&type=0 website visited Aug. 4, 2017, pp. 1-4.
"Mobile application management MAM" https://www.citrix.com/enterprise-mobility-management/mam.html, website visited Aug. 4, 2017, pp. 1-3.
"Mobile device management" https://www.citrix.com/enterprise-mobility-management/mdm.html, website visited Aug. 4, 2017, pp. 1-3.
"Secure remote access to hybrid cloud and SaaS" https://www.citrix.com/products/netscaler-unified-gateway/, website visited Aug. 4, 2017, pp. 1-7.
"Endless Content At Oktane17" https://www.okta.com/ Aug. 28-30, 2017, websited visited Aug. 4, 2017, pp. 1-6.
"Welcome to OpenID Connect" http://openid.net/connect/ website visited Aug. 4, 2017, pp. 1-4.
"The world's #1 CRM platform has everything you need to blaze new trails" https://www.salesforce.com/products/ website visited Aug. 29, 2017, pp. 1-13.
"Dev Overview of SAML" https://developers.onelogin.com/saml, website visited Aug. 29, 2017, pp. 1-5.
Margaret Rouse "Enterprise Mobility Management (EMM)"http://searchmobilecomputing.techtarget.com/definition/enterprise-mobility-management-EMM, website visited on Aug. 4, 2017, pp. 1-4.
"What is Single Sign On?" https://auth0.com/docs/sso/current , website visited Aug. 4, 2017, pp. 1-8.
"XenMobile—Enterprise Mobility Management Solution—Citrix" https://www.citrix.com/products/xenmobile/ , website Aug. 4, 2017, pp. 1-7.
Oct. 31, 2019—(JP) Office Action—App 2018-175020 w/ English translation, pp. 1-5.

* cited by examiner

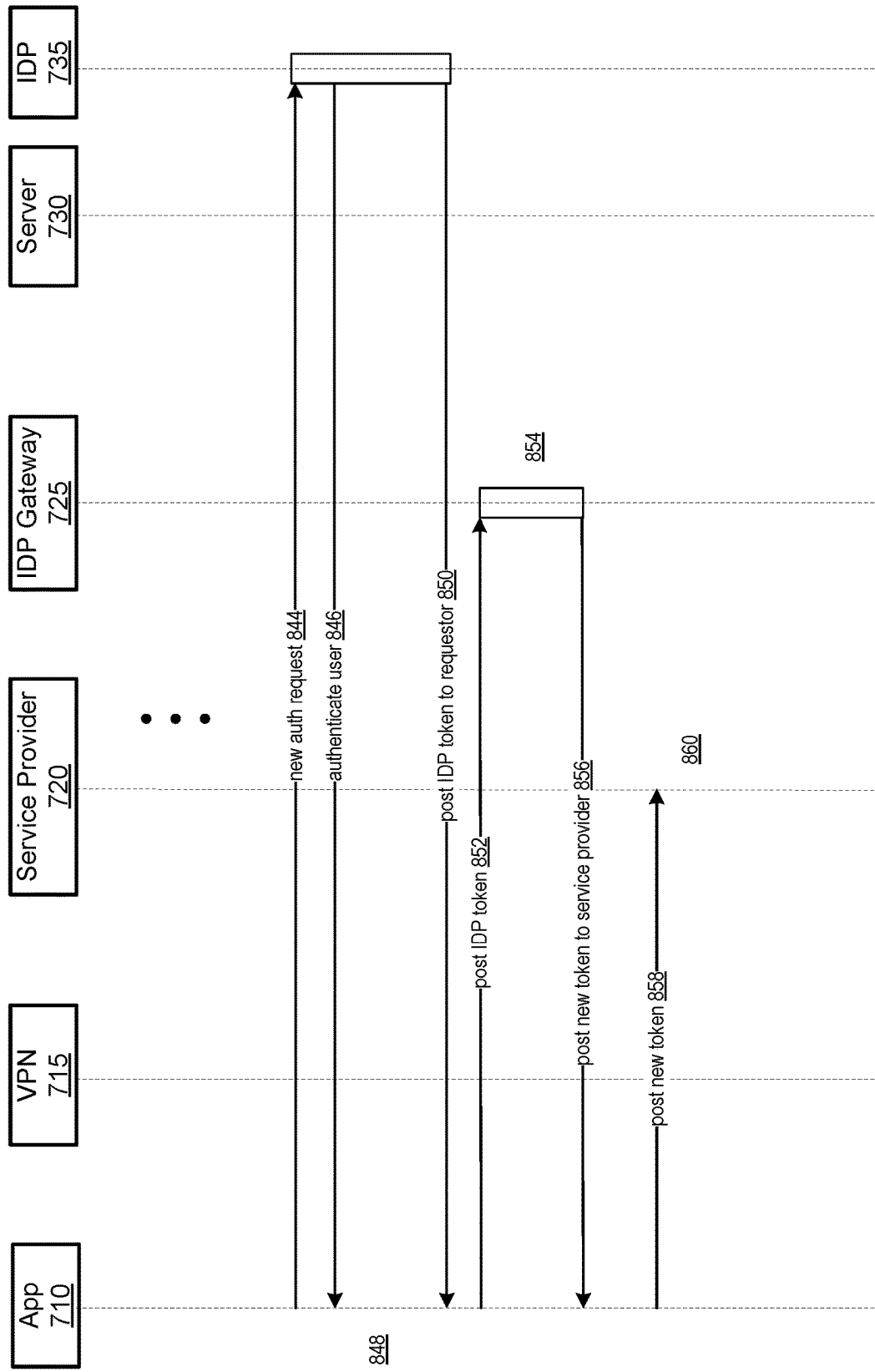

SECURE SINGLE SIGN ON AND CONDITIONAL ACCESS FOR CLIENT APPLICATIONS

CROSS-REFERENCE TO RELATED APPLICATIONS

This application is a continuation of pending U.S. patent application Ser. No. 15/919,935, filed Sep. Mar. 13, 2018 and entitled "SECURE SINGLE SIGN ON AND CONDITIONAL ACCESS FOR CLIENT APPLICATIONS," which is a continuation of U.S. patent application Ser. No. 15/716,871 (now U.S. Pat. No. 9,948,612), filed Sep. 27, 2017 and entitled "SECURE SINGLE SIGN ON AND CONDITIONAL ACCESS FOR CLIENT APPLICATIONS." The prior applications are incorporated herein by reference in their entirety.

FIELD

Aspects described herein generally relate to computer networking and data security. More specifically, aspects described herein relate to granting client devices access to one or more resources using single sign on and/or conditional access mechanisms.

BACKGROUND

Increasingly, software applications (e.g., enterprise applications) may be consumed using devices that might not be corporate issued devices, such as bring your own device (BYOD) devices. End users may desire a consumer-like user experience for their enterprise applications. For example, users may desire the ability to perform single sign on (SSO) to enterprise applications. At the same time, IT departments may desire enterprise data to be securely consumed by authorized users, on authorized endpoints, and using authorized applications. They may also desire to leverage technologies, such as machine learning, to recognize anomalous behaviors and limit access to enterprise data using conditional access mechanisms.

SSO and conditional access may be challenging for certain platforms, such as mobile device platforms. For example, mobile platforms (e.g. iOS, Android, Windows 10, etc.) may be strong on application sandboxing, which may prevent traditional solutions for SSO that are used on desktop computers (e.g., shared system key-chain or shared authentication cookies). Mobile endpoints may be BYOD devices and may have non-enterprise applications installed by, for example, the end user. There is a need to control which applications have access to the SSO functionality. There is also a need to consider factors that affect conditional access decisions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A secure communication tunnel may be established between an application running on a mobile device and an identity provider gateway device. The identity provider gateway device may receive, from the application running on the mobile device, and via the secure communication tunnel, an authentication request comprising a client certificate. The identity provider gateway device may extract, from the client certificate, a device identifier associated with the mobile device. The identity provider gateway device may transmit, to a device management server, a request to determine whether the mobile device is compliant with security policies. The request to determine whether the mobile device is compliant with security policies may comprise the device identifier associated with the mobile device. In response to transmitting the request to determine whether the mobile device is compliant with security policies, the identity provider gateway device may receive, from the device management server, an indication of whether the mobile device is compliant with security policies. The identity provider gateway device may determine, based on the indication of whether the mobile device is compliant with security policies, whether to grant the application running on the mobile device access to a service associated with the application running on the mobile device.

In some aspects, establishing the secure communication tunnel may comprise detecting a request, by the application running on the mobile device, to access the identity provider gateway device. A tunneling application may intercept the request to access the identity provider gateway device. The tunneling application may establish, using the client certificate, the secure communication tunnel between the application running on the mobile device and the identity provider gateway device. Establishing the secure communication tunnel may be performed in response to a request, from a service provider of the service, to redirect the authentication request to the identity provider gateway device. The secure communication tunnel may comprise a virtual private network (VPN) tunnel.

In some aspects, after determining to grant access to the service, the identity provider gateway device may retrieve cached authentication data associated with the mobile device. The identity provider gateway device may generate, using the cached authentication data, an authentication token. The identity provider gateway device may transmit, to the mobile device, the authentication token. The authentication token may be used by the mobile device to access the service associated with the application running on the mobile device.

In some aspects, the identity provider gateway device may determine that authentication data associated with the mobile device is not cached at the identity provider gateway device. In response to determining that the authentication data is not cached at the identity provider gateway device, the identity provider gateway device may transmit, to the mobile device, a request for the authentication data from an identity provider device. The identity provider gateway device may receive, from the mobile device, and via the identity provider device, the authentication data associated with the mobile device. The identity provider gateway device may cache the authentication data associated with the mobile device. After a predetermined amount of time, the identity provider gateway device may remove the cached authentication data associated with the mobile device.

In some aspects, the identity provider gateway device may retrieve the cached authentication data associated with the mobile device. The identity provider gateway device may generate, using the cached authentication data, an authentication token. The identity provider gateway device may transmit, to the mobile device, the authentication token.

In some aspects, after determining to grant access to the service, the identity provider gateway device may extract, from the client certificate, a user identifier associated with a user of the mobile device. The identity provider gateway device may generate, using the user identifier, an authentication token. The identity provider gateway device may transmit, to the mobile device, the authentication token.

In some aspects, after extracting the user identifier, the identity provider gateway device may transmit, to a directory service, a request for additional data associated with the user of the mobile device. The identity provider gateway device may receive, from the directory service, the additional data associated with the user of the mobile device. Generating the authentication token may comprise generating the authentication token using the user identifier and the additional data associated with the user received from the directory service.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 8A-B depict an illustrative system and method for single sign on and/or conditional access for client applications in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
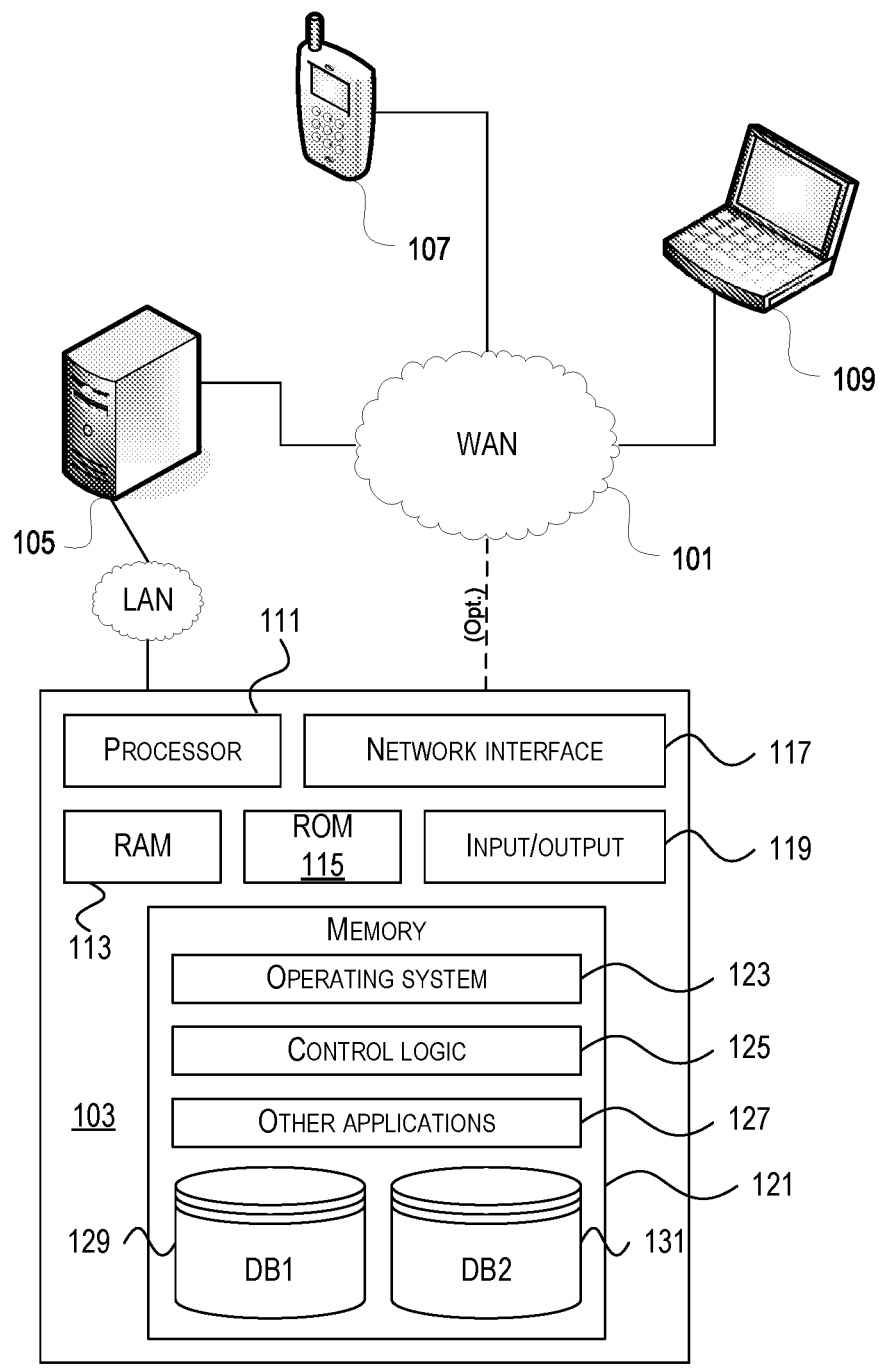
FIG. 1 depicts an illustrative computer system architecture that may be used in accordance with one or more illustrative aspects described herein.

Computer software, hardware, and networks may be utilized in a variety of different system environments, including standalone, networked, remote-access (also known as, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
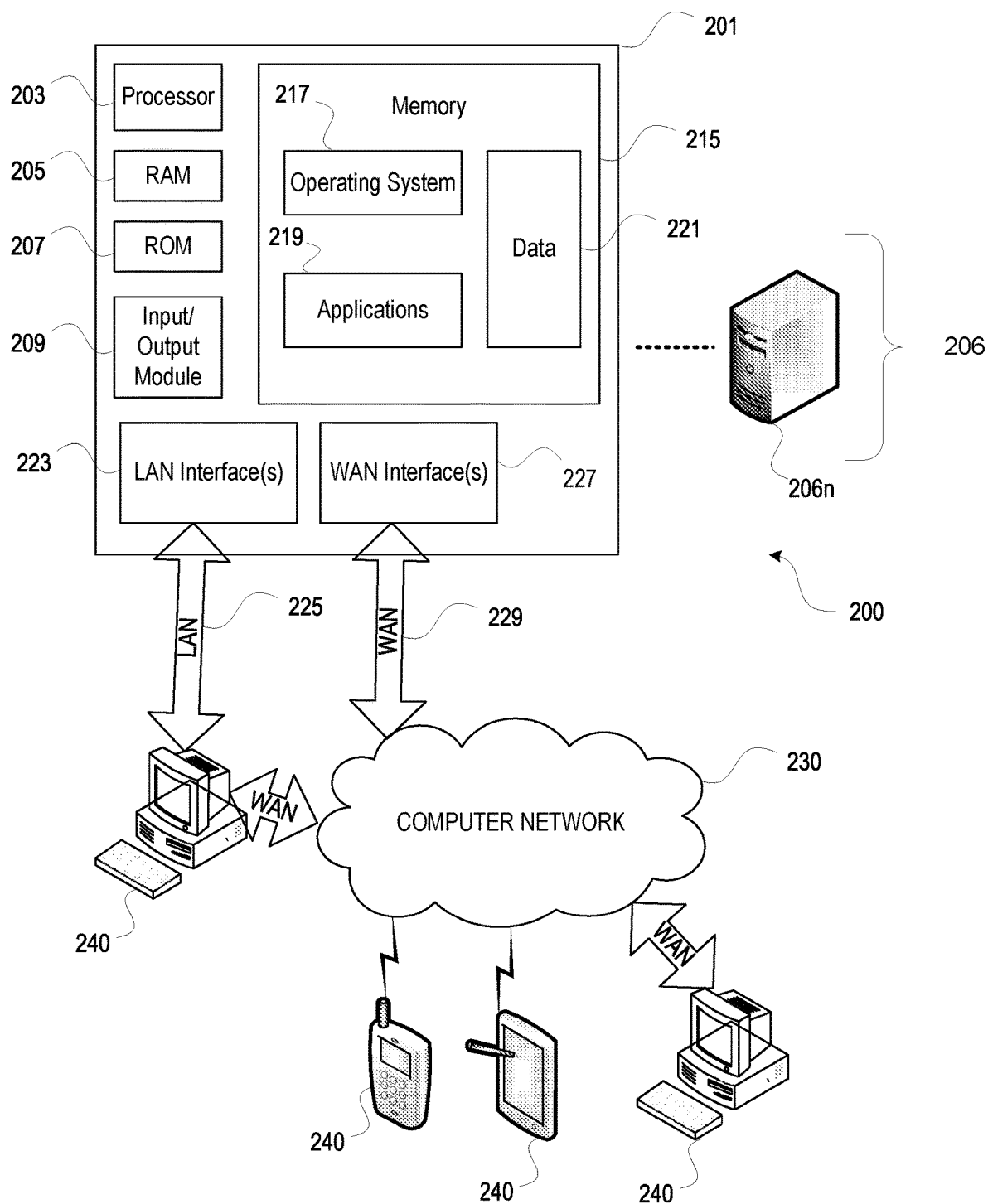
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
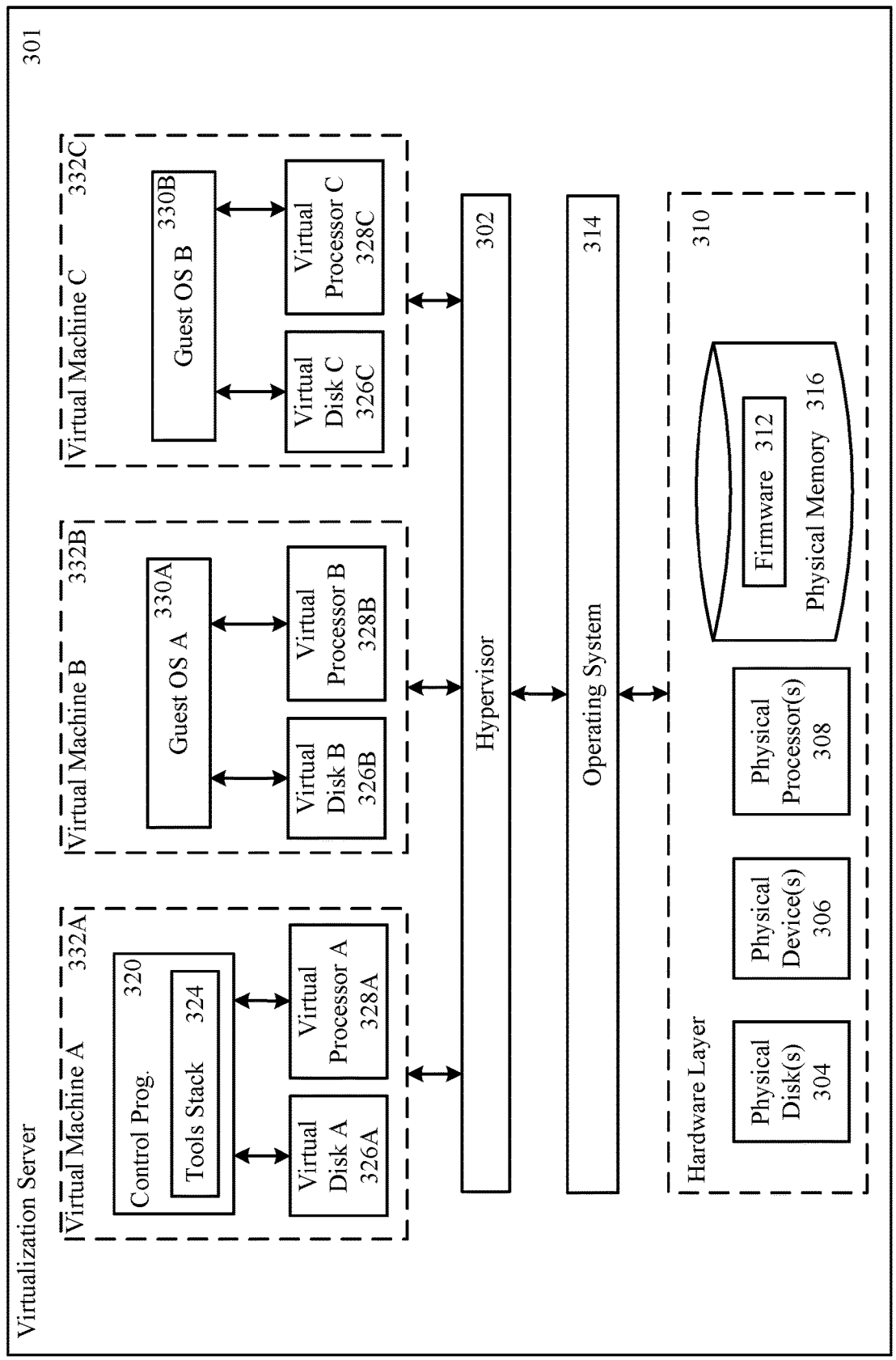
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud-computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
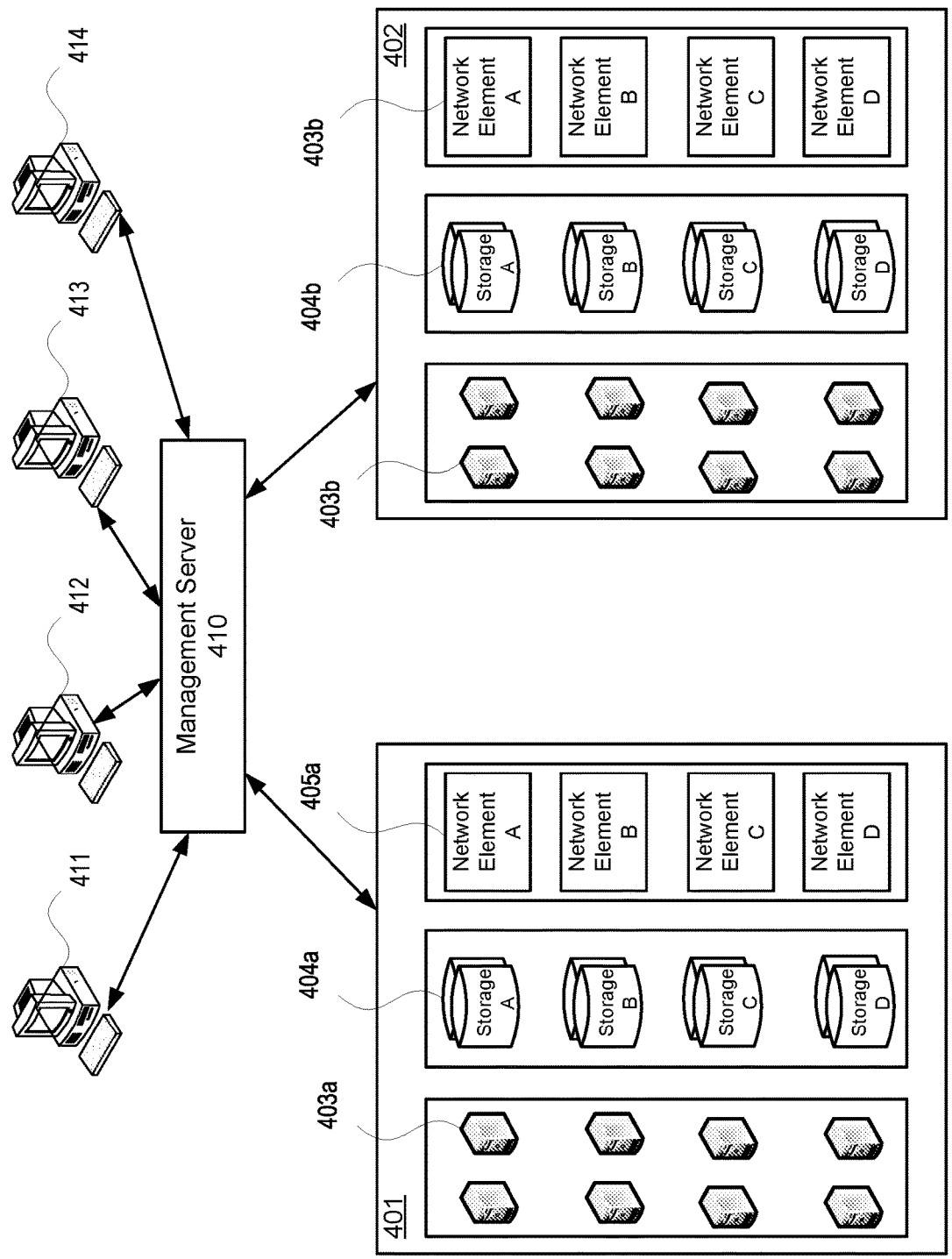
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
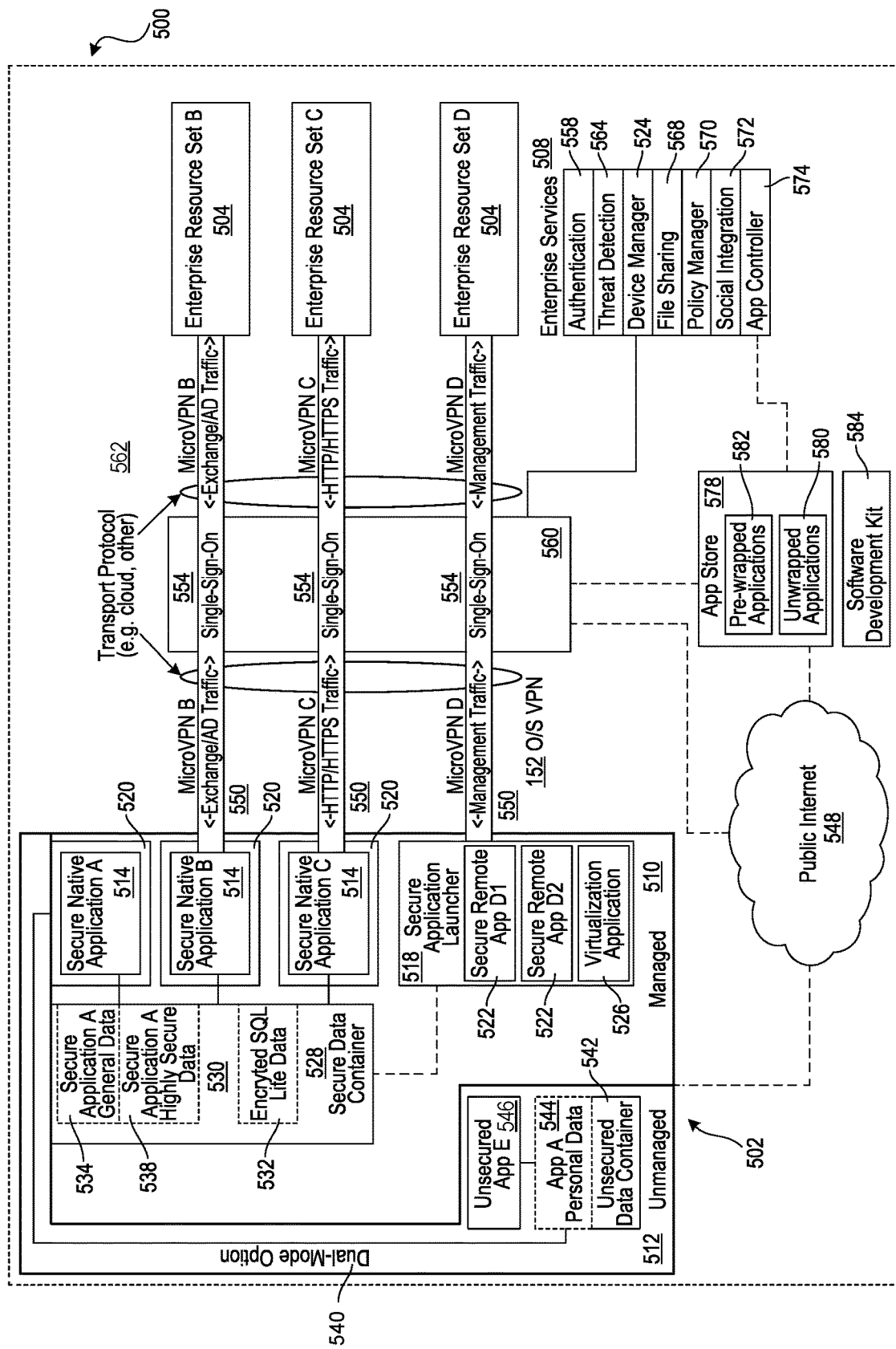
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is not accessible by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application may use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications (e.g., as illustrated by microVPNs 550), particular devices, particular secured areas on the mobile device (e.g., as illustrated by O/S VPN 552), and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like.

Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
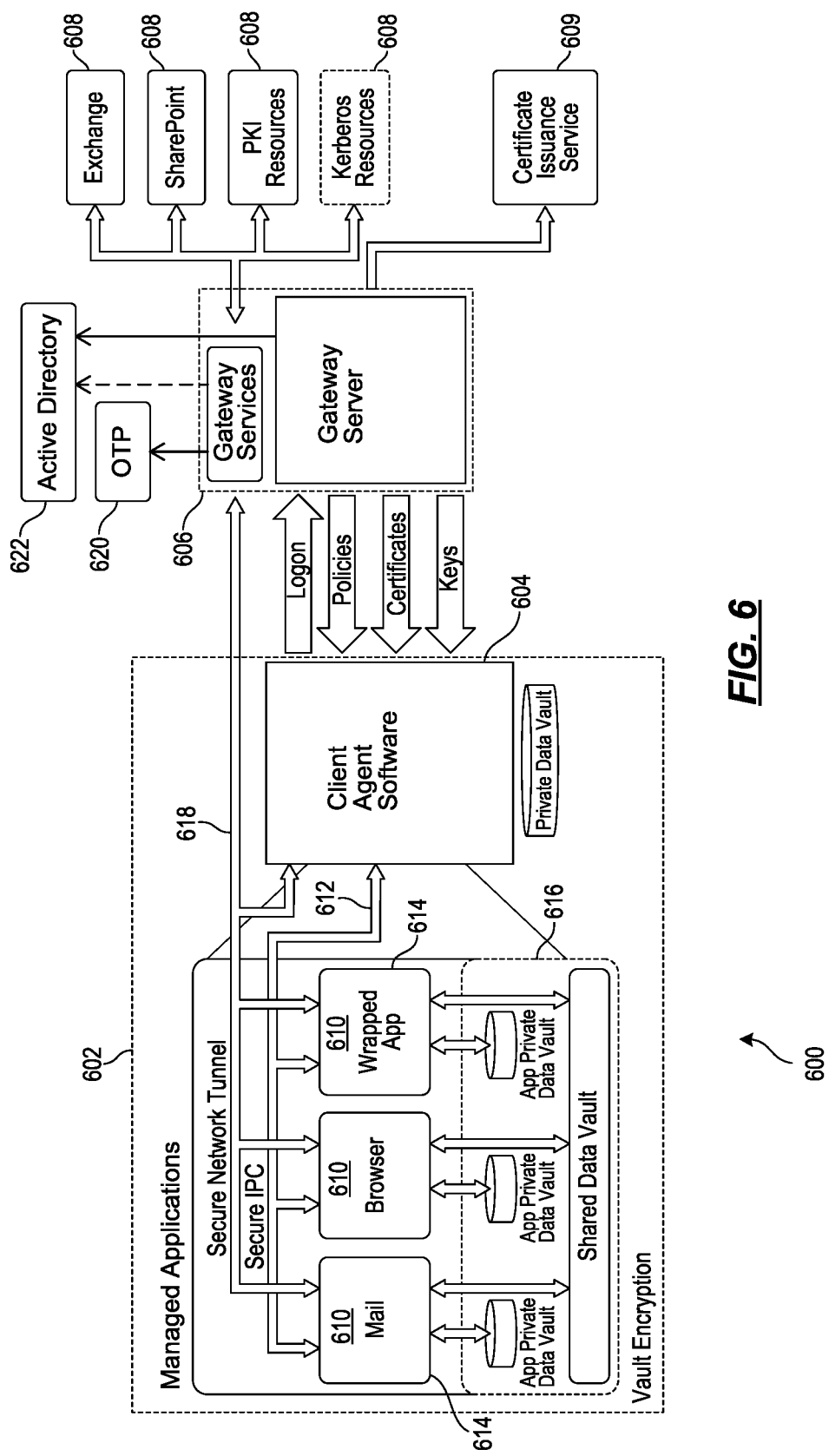
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The Secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases might not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to more sensitive data using strong authentication, and ensure that access to these applications is only permitted after performing appropriate authentication, even if this means a re-authentication is requested from the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector might cause multiple copies of the same encrypted data to yield different cipher text output, preventing both replay and cryptanalytic attacks. This may also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate might never be present in the iOS keychain and might not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is used, when an application reads a certificate for "who am I," when an application uses the certificate to build a secure session token, and when an application uses private keys for digital signing of important data (e.g. transaction log) or for temporary data encryption.

Illustrative Examples of Single Sign On and/or Conditional Access for Client Applications Systems and methods of implementing single sign on (SSO) and/or conditional access for client applications, such as mobile applications, are described herein. One or more of the systems and methods for SSO and/or conditional access may be secure. For example, the system may be able to identify authorized users, identify authorized devices, and/or identify authorized applications. One or more SSO and/or conditional access capability described herein may be achieved securely, without sacrificing the ability of IT administrators to control which users, devices, and/or applications have access to the functionality. In some aspects, conditional access decisions may be made based on various factors, such as user identity, device identity, application identity, location of access, etc.

One or more of the systems and methods for SSO and/or conditional access described herein may be application neutral. For example, the systems and methods described herein may handle various types of mobile applications and/or might not require modifications to the applications (e.g., without using an SDK, without wrapping the application, etc.). One or more of the systems and methods for SSO and/or conditional access described herein may be identity provider (IDP) neutral. For example, aspects described herein may utilize and support any standards-based IDP. One or more of the systems and methods for SSO and/or conditional access described herein may be platform neutral. For example, they may support any popular mobile platform, such as ANDROID, iOS, WINDOWS, or any other mobile device platform.

In some aspects, one or more of the systems and methods described herein can be used to achieve zero touch mobile SSO, such as where an authorized user using an authorized application from an authorized device can authenticate without any additional user interaction.

Figure 7:
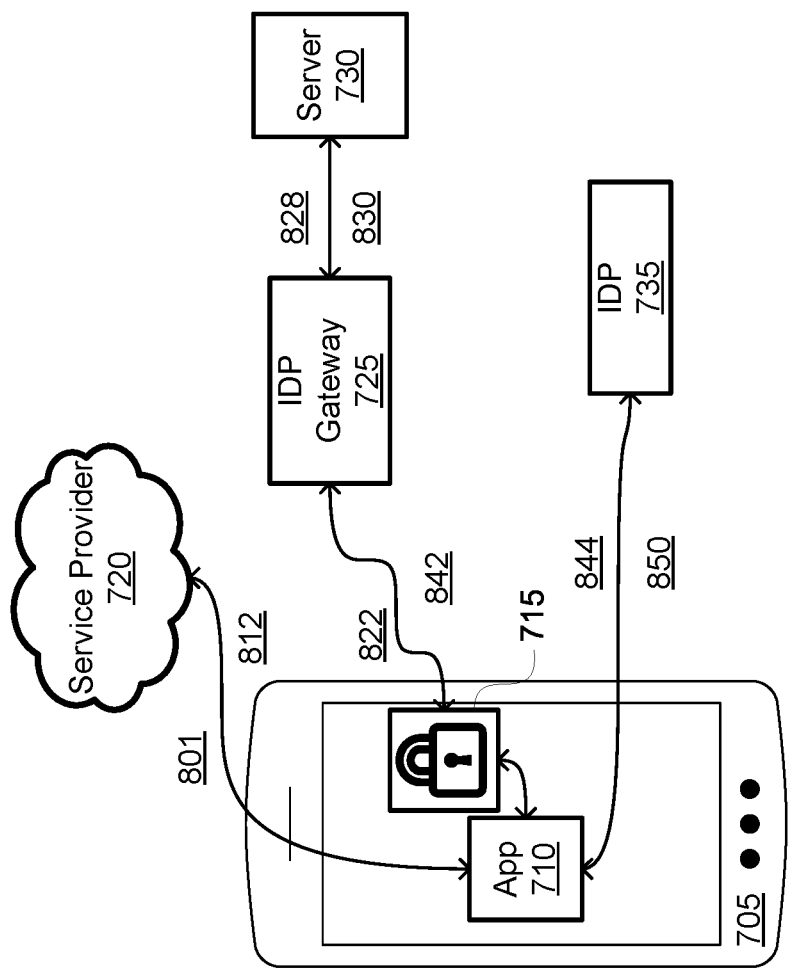
FIG. 7 depicts an illustrative system and method for single sign on and/or conditional access for client applications in accordance with one or more illustrative aspects described herein.

FIG. 7 depicts an illustrative system and method for single sign on and/or conditional access for client applications in accordance with one or more illustrative aspects described herein. The system may comprise a client device 705. The client device 705 may be, for example, a mobile device, such as a mobile phone, a tablet, a smartwatch, a virtual reality or augmented reality headset, or any other mobile device. The client device 705 might not be a corporate issued or managed device and may be, for example, a BYOD device. In some aspects, the client device 705 may be device 103, device 105, device 107, or device 109 illustrated in FIG. 1, one of the terminals 240 illustrated in FIG. 2, one of the client computers 411-414 illustrated in FIG. 4, the mobile device 502 illustrated in FIG. 5, the mobile device 602 illustrated in FIG. 6, or any other client device.

The client device 705 may comprise one or more client applications 710. In some aspects, a client application may be configured to authenticate via a particular identity provider (IDP), such as IDP 735. However, the client application's backend service may be reconfigured to federate authentication to an IDP gateway, such as IDP gateway 725. In federated authentication scenarios, a company may authenticate a user of the client device 705 and allow access to a service provided by a service provider (e.g., instead of the service provider authenticating user).

The client device 705 may comprise one or more VPN services 715. Each VPN service may comprise a per-app VPN that may be launched on demand and may be used to connect the client device 705 to the IDP gateway 725, as will be described in further detail below.

The system may comprise one or more servers 730, such as a device management server (e.g., an enterprise mobility management server in an enterprise mobility management system). The server 730 may be configured to manage client devices, such as to install VPNs (e.g., per-app VPNs) on authorized client devices, such as the client device 705. The server 730 (or another device in the system) may deliver a client certificate to the per-app VPN, and the client certificate may encode user identity information, device identity information (e.g., as Subject AlternativeNames), or other user or device information. The device identity information may comprise any unique string for identifying the client device 705, and the string may be based on a configuration in the system. The user identity information may comprise, for example, an email address, a username, a user principal name, or any other identity for identifying the user of the client device 705. The server 730 (or another device in the system) may configure the per-app VPN to use client certificate authentication with a certificate delivered by the server 730 (or another device in the system). In some aspects, the server 730 (or another device in the system) may configure the per-app VPN to accept requests from authorized applications and/or to intercept requests to the IDP gateway 725. Intercepting only certain requests may lead to more efficient use of processing resources and communications bandwidth by reducing the number of requests to be handled. The server 730 may also be used to determine whether a client device 705 requesting access to resources is compliant with security policies, as will be described in further detail below.

The system may comprise one or more service providers 720. The service provider 720 may make one or more resources (e.g., document editing resources, customer relationship management (CRM) resources, email services, banking resources, etc.) available to the user of the client device 705. In some aspects, application 710 may be managed, provided, and/or developed by the service provider 720 or an affiliate of the service provider 720.

The system may comprise one or more IDP gateways 725. The IDP gateway 725 may be configured to federate authentication to the original IDP 735 of a back-end service (e.g., a service provided by the service provider 720). The IDP gateway 725 may behave like a standards-based IDP for any service provider. The IDP gateway 725 may behave like a standards-based service provider for any standards-based IDP (e.g., a real IDP). The IDP gateway 725 may additionally or alternatively behave like a real IDP. The IDP gateway 725 may be accessed by endpoints (e.g., the client device 705) either directly or via an authorized VPN tunnel.

The system may comprise one or more identity providers 735, which may be an original IDP used to authenticate the user of the client device 705. As will be described in further detail below, the identity provider 735 may handle cases of access from unmanaged endpoints, desktops, and/or rogue applications.

Figure 8A:
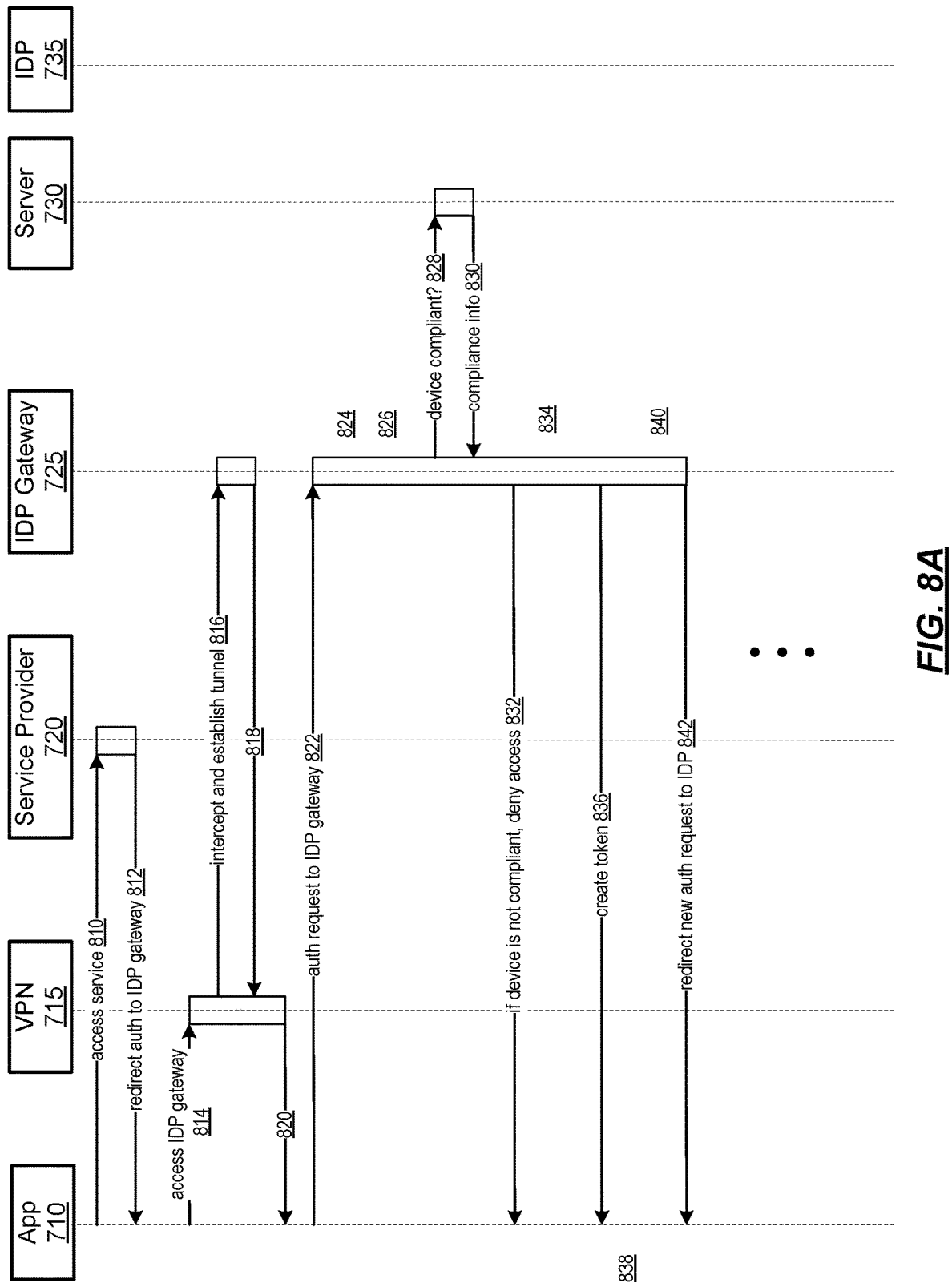

FIGS. 8A-B depict an illustrative system and method for single sign on and/or conditional access for client applications in accordance with one or more illustrative aspects described herein.

In step 810, the client device (e.g., via a client application 710, such as a mobile application) may transmit a request to access a service from the service provider 720. For example, a user of the client device may select, via an input device of the client device, such as a touch screen, keyboard, mouse, gesture, etc., an icon for the client application 710, and the client application 710 may initiate communications between the client device and the service provider 720.

In step 812, the service provider 720 may receive the request from the client application 710. The service provider 710 may transmit, to the client application 710 of the client device, a request to redirect authentication to an identity provider (IDP) gateway 725. The request to redirect may indicate that the service provider 720 is the requestor. For example, when a mobile application authenticates, its back-end service may redirect it to the identity provider gateway 725 rather than authenticating directly with the service provider 720 or redirecting authentication to the original identity provider 735. As will be described in further detail below, a secure communication tunnel may be established between the application 710 and the identity provider gateway 725 in response to the request from the service provider 720 to redirect the authentication request to the identity provider gateway 725.

In step 814, the client application 710 may request to access the identity provider gateway 725. In step 816, a tunneling application (e.g., a virtual private network (VPN) 715, such as a per-app VPN plugin) may intercept the request to access the identity provider gateway 725 and may establish a secure communication tunnel (e.g., a VPN tunnel) between the client application 710 and the identity provider gateway 725 using, for example, a client certificate. Establishing the secure communication tunnel may comprise detecting (e.g., by the VPN 715) a request, by the application 710 running on the client device, to access the identity provider gateway 725. For example, when the application 710 attempts to reach the identity provider gateway 725, a per-app VPN may kick in and establish a VPN tunnel using the configured client certificate for authentication to the VPN endpoint. The tunneling application may intercept the request to access the identity provider gateway 725 and/or establish the secure communication tunnel using the client certificate. The tunneling application may encode user identity and/or device identity information in the request. In some aspects, the tunneling application may accept requests from authorized applications, but might not accept requests from unauthorized applications. Additionally or alternatively, the tunneling application may intercept requests intended for the identity provider gateway 725, but might not accept requests that are not intended for the identity provider gateway 725.

In step 818, the identity provider gateway 725 may confirm establishment of the secure communication tunnel between the client application 710 and the identity provider gateway 725. In step 820, the VPN 715 may receive the confirmation and forward the confirmation to the client application 710. The secure communication tunnel between the client application 710 and the identity provider gateway 725 may be established.

In step 822, the client application 710 may transmit an authentication request to the identity provider gateway 725, such as via the secure communication tunnel. The identity provider gateway 725 may receive, from the application 710, and via the secure communication tunnel, the authentication request, which may use a client certificate. The client certificate may be used to establish the tunnel itself. In other examples, the authentication request might not come via the secure communication tunnel and/or might not use the client certificate.

In step 824, the identity provider gateway 725 may determine whether the request came via a tunnel authenticated using a client certificate. If a client certificate was not used to establish the tunnel (e.g., VPN tunnel), the identity provider gateway 725 may determine that the client device is a non-managed client device. The identity provider gateway 725 may determine that single sign on and conditional access are not available for the client request, and the identity provider gateway 725 may redirect the client device to the identity provider 735 (e.g., the original identity provider). This feature may handle cases of access from unmanaged endpoints, desktops, and/or rogue applications. These accesses might not get single sign on functionality. A new authentication request may be constructed by the client device, and the client device may forward the new authentication request to the identity provider 735, instead of the identity provider gateway 725.

If, on the other hand, an authentication request came via a tunnel and used a client certificate (e.g., as determined in step 824), in step 826, the identity provider gateway 725 may extract, from the client certificate, a device identifier for the client device (e.g., a mobile device) and/or a user identifier for the user. In step 828, the identity provider gateway 725 may transmit, to the server 730 (which may comprise a device management server), a request to determine whether the client (e.g., mobile) device is compliant with security policies. The request to determine whether the mobile device is compliant with security policies may comprise the device identifier associated with the mobile device.

In step 830, the server 730 may return, to the identity provider gateway 725, compliance information, which may indicate whether the client device is compliant. For example, in response to transmitting the request to determine whether the mobile device is compliant with security policies, the identity provider gateway 725 may receive, from the device management server 730, an indication of whether the mobile device is compliant with security policies. The identity provider gateway 725 may determine, based on an indication of whether the mobile device is compliant with security policies (e.g., which may be compliance information returned by the server 730), whether the client device is compliant. The identity provider gateway 725 may determine, based on the compliance information, whether to grant the application 710 running on the client device access to a service associated with the application 710 running on the client device and/or the service provider 720. This feature may provide conditional access, such as based on a device security profile.

In step 832, if the client device is not compliant, the identity provider gateway 725 may deny access and/or deny authentication to the client device. Otherwise, the identity provider gateway 725 may proceed to step 834 if, for example, the identity provider gateway 725 determines that the client device is compliant and/or to otherwise grant the client device access to services of the service provider 720.

In step 834, the identity provider gateway 725 may determine whether unexpired cached authentication data (e.g., SAML content, such as claims) is available for the client device. As will be described in further detail below, the identity provider gateway 725 may cache authentication data associated with the client device for future authentication requests. The cached authentication data may have an expiry time. If unexpired cached authentication content is available, the identity provider gateway 725 may retrieve the cached authentication data associated with the client device. In step 836, the identity provider gateway 725 may generate, using the cached authentication data (e.g., SAML content, such as claims), an authentication token (e.g., a SAML token) and/or sign it. For example, the token may comprise a digitally signed assertion with the user's identifier, roots, and/or other data about the user. The identity provider gateway 725 may transmit, to the client device (e.g., via the application 710), the authentication token. In step 838, the authentication token may be used by the client device to access the service associated with the application 710 running on the mobile device (e.g., a service provided by the service provider 720). These features may provide a single sign on capability. For example, subsequent authentication requests from the same client device within an expiry period might not require user credential re-entry.

In some aspects, the identity provider gateway 725 may determine that authentication data associated with the client device is not cached at the identity provider gateway. If cached authentication content is not available, the identity provider gateway 725 may redirect the client device to the original identity provider 735 to authenticate and fetch a token (e.g., SAML token). As will be described in further detail below, the identity provider gateway 725 may extract the content of the token (e.g., a SAML token), such as a set of claims, and cache the content for future authentication requests. In some aspects, the identity provider gateway 725 may cache the content in its own memory store.

In step 840, in response to determining that authentication data is not cached at the identity provider gateway 725, the identity provider gateway 725 may construct a new authentication request with the identity provider gateway 725 as the requestor. In step 842, the identity provider gateway 725 may transmit, to the client device (e.g., via the client application 710), a request for the authentication data from an identity provider 735 (e.g., an original identity provider). The request may comprise a request to redirect a new authentication request to the identity provider 735. The request to redirect may indicate the identity provider gateway 725 as the requestor.

With reference to FIG. 8B, in step 844, the client application 710 may transmit, to the identity provider 735, a new authentication request, which may indicate the identity provider gateway 725 as the requestor. In step 846, the identity provider 735 may authenticate the user.

In step 848, the client device (e.g., via the client application 710) may request that the user of the client device enter user credentials (e.g., a passcode, a password, a PIN, etc.). Depending on the configuration, multiple interactions may occur in step 848. The credentials may be submitted to the identity provider 735, and the user may be authenticated based on the submitted credentials.

In step 850, the identity provider 735 may transmit a request to post an identity provider token (e.g., SAML token) to the requestor (e.g., identity provider gateway 725). The request may include, for example, the identity provider token. The client device may receive the request and/or the token from the identity provider 735.

In step 852, the client application 710 may transmit, to the identity provider gateway 725, the request to post the identity provider token, with the identity provider token. The identity provider gateway 725 may receive, from the mobile device, the token, which may comprise authentication data associated with the client device.

In step 854, the identity provider gateway 725 may process the identity provider token. The identity provider gateway 725 may extract, from the token, the authentication data associated with the client device and may cache the authentication data. The cached authentication data may comprise, for example, token contents (e.g., SAML token contents). For future authentication requests from the client application 710 and via the secure communication tunnel, the identity provider gateway 725 may retrieve the cached authentication data, generate an authentication token using the cached authentication data, and/or transmit the authentication token to the client application 710 (e.g., as described above with reference to step 834 and step 836). After a predetermined amount of time (e.g., an expiry time), the identity provider gateway device 725 may remove the cached authentication data associated with the client device.

In step 856, the identity provider gateway 725 may transmit a request to post the new token (e.g., SAML token) to the service provider 720. In step 858, the client application 710 may transmit, to the service provider 720, the request to post the new token. The application 710 may present the token (e.g., SAML token) to the service provider 720 to obtain access to resources of the service provider 720. In step 860, the service provider 720 may process the token and grant, to the client device, access to resources.

A very similar method can be used to support OpenID Connect and other federation standards as well. For example, an access code or authentication code may be used instead of a token (e.g., a SAML token). An identity provider in one or more of these systems may issue tokens, which may be signed assertions similar to SAML claims.

Figure 9:
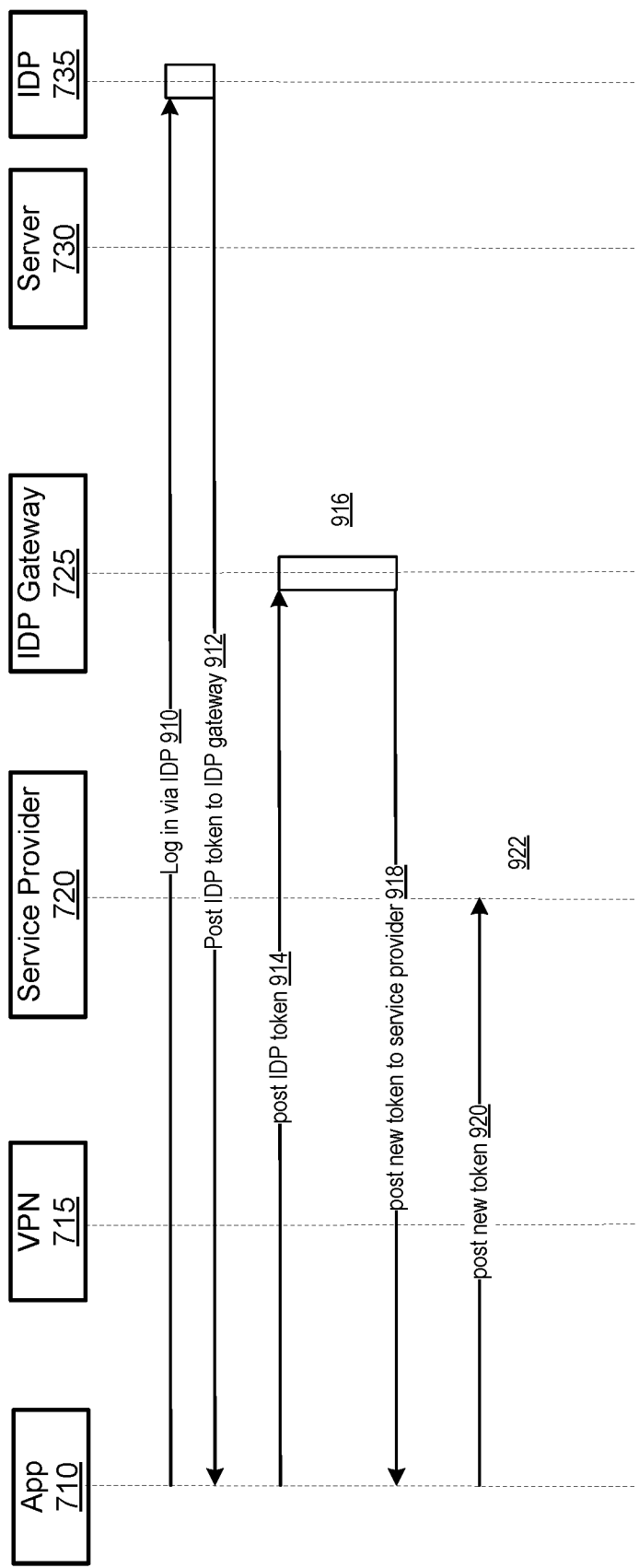
FIG. 9 depicts another illustrative system and method for single sign on and/or conditional access for client applications in accordance with one or more illustrative aspects described herein.

FIG. 9 depicts another illustrative system and method for single sign on and/or conditional access for client applications in accordance with one or more illustrative aspects described herein. In some aspects, a user may access resources via an application store, such as the application store 578 illustrated in FIG. 5, rather than directly through the service provider 720. The application store may be provided by the identity provider 735. The applications available to the user via the application store may be displayed on a display of the client device 705 and/or may comprise, for example, web applications. The user may select (e.g., click on) an icon for one of the applications in the application store to attempt to access resources associated with the application.

In step 910, the user may log in to an application page provided by the identity provider 735. For example, the user may provide a username, password, passcode, or any other credentials, and the client device may transmit the user's entered credentials to the identity provider 735. In some aspects, the client device might not need to re-authenticate with the identity provider gateway 725 because the client device authenticated directly with the identity provider 735. The user may select (e.g., click on) an application icon.

In step 912, the identity provider 735 may transmit an identity provider token (e.g., SAML token) and/or a request to post the identity provider token to the identity provider gateway 725. The client device may receive the request from the identity provider 735.

In step 914, the client application 710 may transmit, to the identity provider gateway 725, the identity provider token. The identity provider gateway 725 may receive, from the client device, the token, which may comprise authentication data associated with the client device. The token may be received after authentication of the client device 710 with the identity provider 735.

In step 916, the identity provider gateway 725 may process the identity provider token. The identity provider gateway 725 may cache the authentication data associated with the client device, as previously described. The cached authentication data may comprise, for example, token contents (e.g., SAML token contents). The identity provider gateway 725 may retrieve the cached authentication data, generate an authentication token using the cached authentication data, sign the token for the service provider 720, and/or transmit, via a secure communication tunnel, the authentication token to the client application 710. As previously described, the identity provider gateway device 725 may remove the cached authentication data associated with the client device after a predetermined amount of time (e.g., an expiry time).

In step 918, the identity provider gateway 725 may transmit, to the client application 710, a request to post the new token (e.g., SAML token) to the service provider 720. The client application 710 may receive the request from the identity provider gateway 725.

In step 920, the client application 710 may transmit, to the service provider 720, the request to post the new token. The application 710 may present the token (e.g., SAML token) to the service provider 720 to obtain access to resources of the service provider 720. In step 922, the service provider 720 may process the token and grant, to the client device, access to resources.

In some aspects, the identity provider gateway 725 may be configured to be and/or perform one or more authentication steps of the original identity provider 735. In these examples, end user authentication may occur at the identity provider gateway 725, rather than at the original identity provider 735. The client certificate, which may be presented by the VPN 715, may be used as a factor to authenticate the user, without requiring any additional input from the end user. These examples may achieve zero touch mobile SSO.

With brief reference to step 830 illustrated in FIG. 8A, the identity provider gateway 725 may determine whether the client device is compliant, such as based on the compliance information returned from the server 730. If the identity provider gateway 725 determines that the client device is compliant and/or to otherwise grant the client device access to services of the service provider 720, the system described herein may perform one or more steps to authenticate the user or otherwise give the user access to the services. These steps might not involve a redirect to the original identity provider 735. Instead, the identity provider gateway 725 may obtain additional information from a directory 745 (e.g., an active directory), and the additional information may be used to authenticate the user and/or client device.

Figure 10:
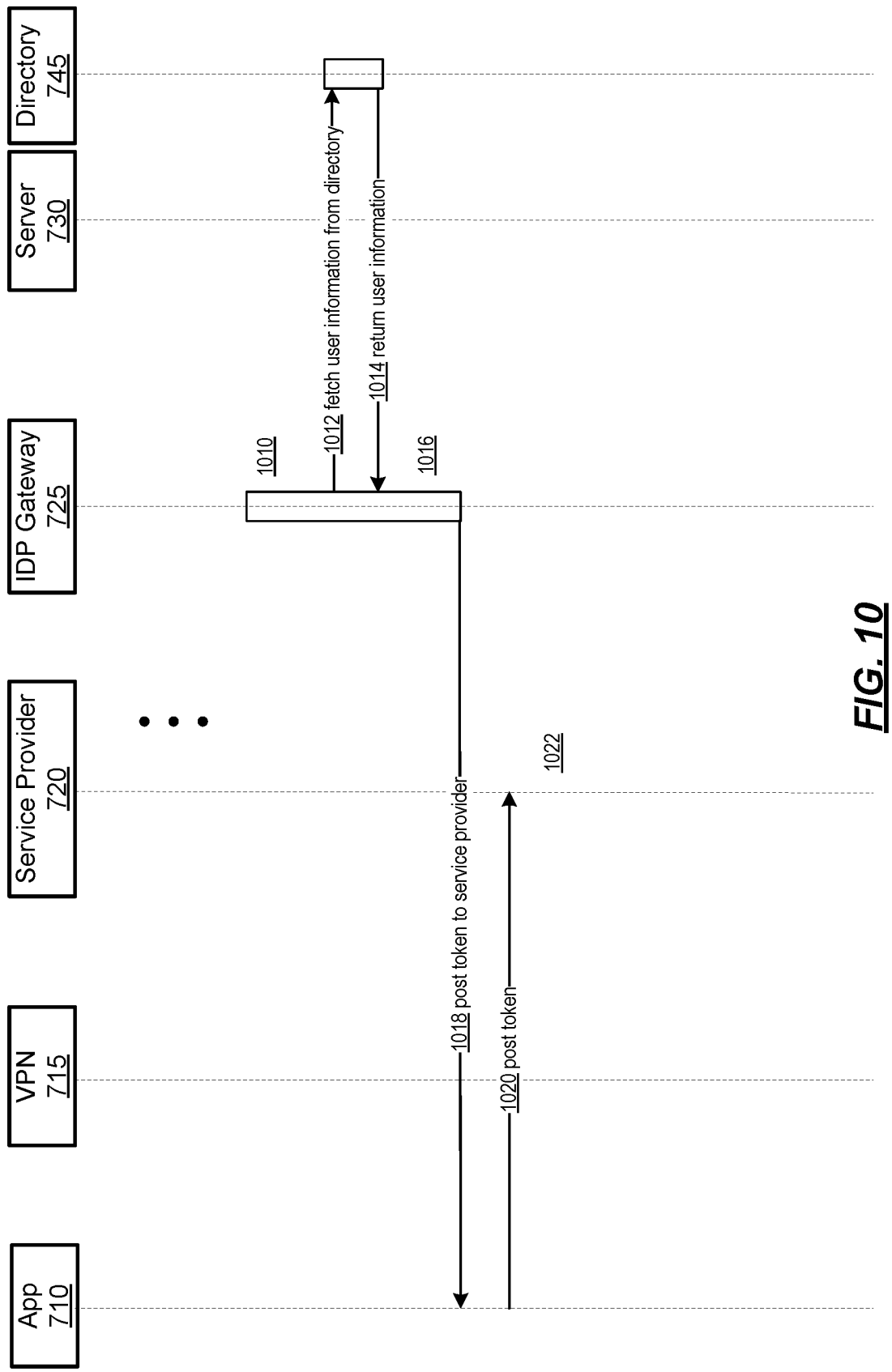
FIG. 10 depicts yet another illustrative system and method for single sign on and/or conditional access for client applications in accordance with one or more illustrative aspects described herein.

FIG. 10 depicts yet another illustrative system and method for single sign on and/or conditional access for client applications in accordance with one or more illustrative aspects described herein. After the identity provider gateway 725 determines that the client device is compliant (e.g., based on the compliance information received in step 830) and/or otherwise determines to grant the client device access to the service, the identity provider gateway 725, in step 1010, may extract, from the client certificate, a user identifier associated with a user of the client (e.g., mobile) device. As previously described, the client certificate may have been used to establish the secure communication tunnel between the client application 710 and the identity provider gateway 725.

In step 1012, the identity provider gateway 725 may transmit, to the directory 745, a request for additional data associated with the user of the client device. The additional user information may comprise, for example, group membership information, whether the user has an email account, the user's email address, etc. The type of information available from the directory 745 may be configurable.

In step 1014, the directory 745 may transmit, to the identity provider gateway 725, the additional user information requested by the identity provider gateway 725. The identity provider gateway 725 may receive the additional user information from the directory 745. In some aspects, the identity provider gateway 725 may have (and/or have access to) a database with the additional user information. In these examples, the identity provider gateway 725 might not transmit a request to the directory 745 for the user information, and may instead access the information from the database.

In step 1016, the identity provider gateway 725 may generate (e.g., construct), using the user identifier and/or the additional user information from the directory 745, an authentication token, such as a SAML token. For example, the token may comprise a digitally signed assertion with the user's identifier, roots, and/or other data about the user.

In step 1018, the identity provider gateway 725 may transmit, to the client device (e.g., running the application 710), the authentication token (e.g., SAML token) and/or a request to post the token to the service provider 720. Step 1018 may be similar to step 856, which was previously described.

In step 1020, the client application 710 may transmit, to the service provider 720, the request to post the token. The application 710 may present the token (e.g., SAML token) to the service provider 720 to obtain access to resources of the service provider 720. Step 1020 may be similar to step 858, which was previously described.

In step 1022, the service provider 720 may process the token and grant, to the client device, access to resources. Step 1022 may be similar to step 860, which was previously described.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, by a computing device, from a user device, and via a secure channel between the user device and the computing device, an authentication request associated with a client certificate;
determining whether the authentication request was received via the secure channel;
extracting, by the computing device, from the client certificate, and based on a determination that the authentication request was received via the secure channel, a device identifier for the user device;
sending, by the computing device and to a server, data indicating the device identifier associated with the user device;
receiving, by the computing device and from the server, data indicating whether the user device is compliant with one or more security policies; and
determining, by the computing device and based on the data indicating whether the user device is compliant with one or more security policies, whether to grant the user device access to a service.

2. The method of claim 1, further comprising:
detecting a request, by the user device, to access the computing device;
intercepting, by a communication application, the request to access the computing device; and
establishing, by the communication application, the secure channel between the user device and the computing device.

3. The method of claim 1, wherein the secure channel comprises a virtual private network (VPN) tunnel.

4. The method of claim 1, further comprising:
establishing the secure channel between the user device and the computing device in response to a request, from a service provider of the service, to redirect the authentication request to the computing device.

5. The method of claim 1, further comprising:
after determining to grant access to the service, retrieving, by the computing device, cached authentication data associated with the user device;

generating, by the computing device and using the cached authentication data, an authentication token; and sending, by the computing device and to the user device, the authentication token.

6. The method of claim 5, wherein the authentication token is configured to be used by the user device to access the service.

7. The method of claim 1, further comprising:

determining, by the computing device, that authentication data associated with the user device is not cached at the computing device;

in response to determining that the authentication data is not cached at the computing device, sending, by the computing device and to the user device, a request for the authentication data from an identity provider device;

receiving, by the computing device, from the user device, and via the identity provider device, the authentication data associated with the user device; and caching, by the computing device, the authentication data associated with the user device.

8. The method of claim 7, further comprising:

retrieving, by the computing device, the cached authentication data associated with the user device;

generating, by the computing device and using the cached authentication data, an authentication token; and sending, by the computing device and to the user device, the authentication token.

9. The method of claim 7, further comprising:

after a predetermined amount of time, removing, by the computing device, the cached authentication data associated with the user device.

10. The method of claim 1, further comprising:

after determining to grant access to the service, determining, by the computing device, and from information associated with the authentication request, a user identifier associated with a user of the user device;

generating, by the computing device and using the user identifier, an authentication token; and sending, by the computing device and to the user device, the authentication token.

11. The method of claim 10, further comprising:

after determining the user identifier, sending, by the computing device and to a directory service, a request for additional data associated with the user of the user device; and receiving, by the computing device and from the directory service, the additional data associated with the user of the user device, wherein generating the authentication token comprises generating the authentication token using the user identifier and the additional data associated with the user received from the directory service.

12. An apparatus comprising:

a processor; and memory storing computer-executable instructions that, when executed by the processor, cause the apparatus to:

receive, from a user device and via a secure channel between the apparatus and the user device, an authentication request associated with a client certificate;

determine whether the authentication request was received via the secure channel;

extract, from the client certificate and based on a determination that the authentication request was received via the secure channel, a device identifier for the user device;

send, to a server, data indicating the device identifier associated with the user device;

receive, from the server, data indicating whether the user device is compliant with one or more security policies; and determine, based on the data indicating whether the user device is compliant with one or more security policies, whether to grant the user device access to a service.

13. The apparatus of claim 12, wherein the memory stores computer-executable instructions that, when executed by the processor, cause the apparatus to:

after determining to grant access to the service, retrieve cached authentication data associated with the user device;

generate, using the cached authentication data, an authentication token; and send, to the user device, the authentication token.

14. The apparatus of claim 13, wherein the authentication token is configured to be used by the user device to access the service.

15. The apparatus of claim 12, wherein the memory stores computer-executable instructions that, when executed by the processor, cause the apparatus to:

determine that authentication data associated with the user device is not cached at the apparatus;

in response to determining that the authentication data is not cached at the apparatus, send, to the user device, a request for the authentication data from an identity provider device;

receive, from the user device and via the identity provider device, the authentication data associated with the user device; and cache the authentication data associated with the user device.

16. The apparatus of claim 15, wherein the memory stores computer-executable instructions that, when executed by the processor, cause the apparatus to:

retrieve the cached authentication data associated with the user device;

generate, using the cached authentication data, an authentication token; and send, to the user device, the authentication token.

17. The apparatus of claim 12, wherein the memory stores computer-executable instructions that, when executed by the processor, cause the apparatus to:

after determining to grant access to the service, determine, from information associated with the authentication request, a user identifier associated with a user of the user device;

generate, using the user identifier, an authentication token; and send, to the user device, the authentication token.

18. A system comprising:

a user device; and a computing device, wherein the user device comprises:

a processor; and memory storing computer-executable instructions that, when executed by the processor of the user device, cause the user device to:

send, to the computing device and via a secure channel between the user device and the computing device, an authentication request associated with a client certificate, and wherein the computing device comprises:

a processor; and memory storing computer-executable instructions that, when executed by the processor of the computing device, cause the computing device to:
- determine whether the authentication request was received via the secure channel;
- extract, from the client certificate and based on a determination that the authentication request was received via the secure channel, a device identifier for the user device;
- send, to a server, data indicating the device identifier associated with the user device;
- receive, from the server, data indicating whether the user device is compliant with one or more security policies; and
- determine, based on the data indicating whether the user device is compliant with one or more security policies, whether to grant the user device access to a service.

19. The system of claim 18, wherein the memory of the user device stores computer-executable instructions that, when executed by the processor of the user device, cause the user device to:
- detect a request to access the computing device;
- intercept, by a communication application, the request to access the computing device; and
- establish, by the communication application, the secure channel between the user device and the computing device.

20. The system of claim 18, wherein the memory of the user device stores computer-executable instructions that, when executed by the processor of the user device, cause the user device to:
- establish the secure channel between the user device and the computing device in response to a request, from a service provider of the service, to redirect the authentication request to the computing device.

* * * * *